June 4, 1957  V. F. D'AGOSTINO  2,794,676
AUTOMATIC FEED DIFFUSER DEVICES FOR AIR TREATING GEL
Filed July 8, 1954

INVENTOR.
VINCENT F. D'AGOSTINO
BY Howard E. Thompson Jr
ATTORNEY

United States Patent Office 2,794,676
Patented June 4, 1957

2,794,676

AUTOMATIC FEED DIFFUSER DEVICES FOR AIR TREATING GEL

Vincent F. D'Agostino, Jackson Heights, N. Y., assignor to Airkem, Inc., New York, N. Y., a corporation of New York Application July 8, 1954, Serial No. 442,131

7 Claims. (Cl. 299—24)

This invention relates to automatic feed diffuser devices for air treating gel. More particularly the invention relates to a dispensing container for multiple bodies of air treating gel having means for normally retaining said gel bodies within the container, but permitting the gel bodies to escape from the container one at a time as the size of individual gel bodies is reduced through evaporation; and to the combination of such dispensing container with receptacle means for receiving ejected gel bodies to expose the same for continued evaporation.

Air treating gels of the type adapted for use with the present invention have been disclosed in co-pending applications of Turner et al. Serial Nos. 178,508 and 178,557 filed August 9, 1950, since combined and issued as U. S. Patent No. 2,691,615 dated October 12, 1954. Such gels can be briefly described as comprising 96 to 99% of an aqueous medium of which 1 to 10% comprises a mixture of volatile air treating components which normally volatilize at different rates, the said aqueous medium being solidified by means of about 1 to 4% of an aqueous gelling agent. Gels of this type have the characteristic property of emitting a vapor mixture of substantially uniform quality throughout the life of the gel i. e. the time required for substantially all of the volatile components of the gel to evaporate.

While air treating gels of the class described have many advantages over wick bottles and similar devices for dispensing air treating vapors, it has been found that gels which are intended to function over extended periods of time may tend to lose some of their efficiency due to a combination of factors. A large gel mass suited for long term evaporation may become crusted or hardened at the surface before all of the volatile components have diffused to the surface and evaporated. In addition long exposure of an evaporating surface of gel may permit the gel to pick up contaminating materials from the air thereby affecting the quality of vapors emitted from the gel. These difficulties are not apparent however, when the individual gel bodies are relatively small and volatile components can escape therefrom before appreciable crusting or contamination of the surface can take place.

The automatic feed diffuser devices in accordance with the present invention provide the long term operation normally associated with large bodies of gel while achieving the superior performance of small gel bodies by utilizing a plurality of small gel bodies which are exposed individually for evaporation with successive gel bodies being exposed only as the previous gel body has been substantially consumed through evaporation. These diffuser devices embody basically a novel dispensing container which can be utilized by itself merely by suspending the same in an inverted position but which is preferably employed in association with receptacle means for receiving gel bodies as they are discharged from the dispensing container.

Novel features of the automatic feed diffuser devices in accordance with the present invention will be readily understood from a consideration of the following specification having reference to the accompanying drawing which shows certain adaptations of the invention, the various parts being identified by suitable reference characters, and in which.

Figure 1:
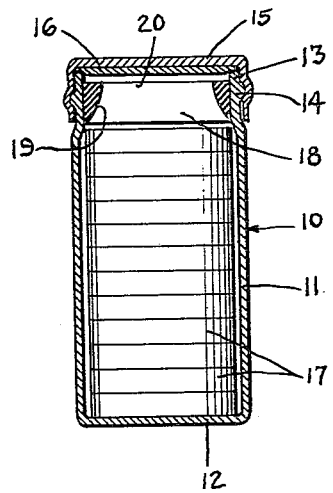
Fig. 1 is a sectional view of a typical dispensing container in accordance with the present invention with a closure means affixed thereto.

In Fig. 1 of the drawing a typical gel dispenser in accordance with the present invention is shown in its original sealed condition as it would be stored and shipped. This device comprises a casing part 10 which is preferably of cylindrical contour having side walls 11, a bottom wall 12 and a wide mouth portion 13 having means as indicated by the protruding lugs or screw-threads 14 for securing a closure cap 15 thereto. It will be understood that any type of closure cap and securing means can be employed, the inner surface of the cap 15 being preferably provided with a gasket 16 to provide a vapor-tight seal when the cap is in place.

The container 10 is preferably of substantially greater height than diameter providing a chamber to receive a plurality of thin discs 17 of air treating gel. These discs may vary in thickness from about ⅛ inch to about ½ inch with the optimum size depending in particular upon the diameter of the discs. Thus for example if the discs are cut 1 inch in diameter a thickness of about ¼ inch has been found to be satisfactory and generally the thickness of the discs should be increased or decreased as the diameter is respectively increased or decreased. The discs can pass closely through the mouth 13 of the container, but are preferably slightly spaced from the inner surface of the wall 11 as illustrated in the drawing.

After the discs 17 have been inserted in the container 10 a discharge control ring 18 is inserted in the mouth 13 of the container. The disc 18 has an inner curved or frusto-conical contour providing a tapered surface 19 terminating at the outer edge thereof in a reduced opening 20. The ring 18 can be fashioned from various materials such as plastic, rubber-like compositions, and the like and can be retained in position in various ways. The ring 18 can merely have a force or friction fit within the mouth 13 of the container or if desired, it can be cemented or otherwise secured in position. The engagement between the ring 18 and the container mouth 13 must in any event be sufficient to support the weight of the column of gel discs when the device is arranged in the inverted position shown in Figs. 2 to 4.

Figure 3:
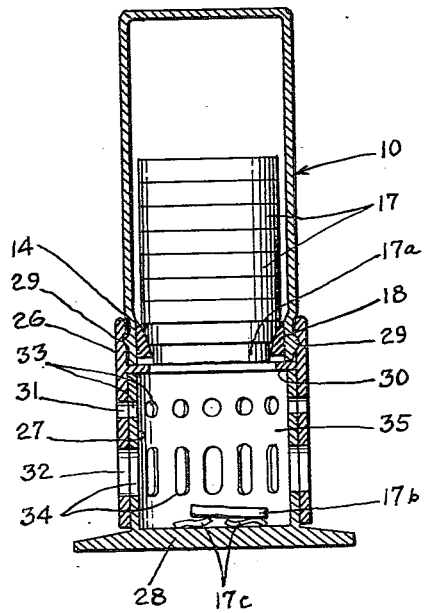
Fig. 3 is a view generally similar to Fig. 2, but showing the dispensing container associated with a receptacle means which is in the form of a supporting base having adjustable means for controlling circulation of air therethrough.
Figure 2:
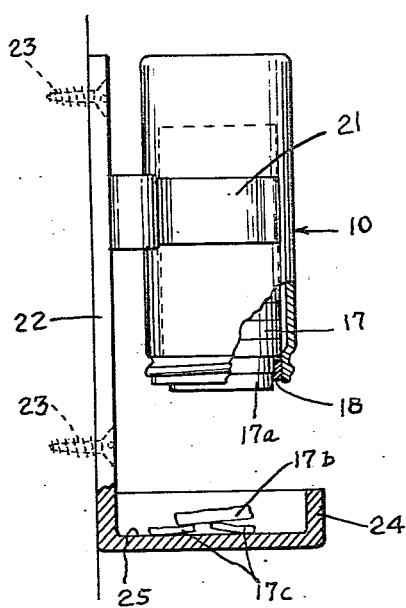
Fig. 2 is a side elevation view partially in section showing the dispensing container suspended in operative position and also indicating one form of receptacle means for discharged gel bodies.
Figure 4:
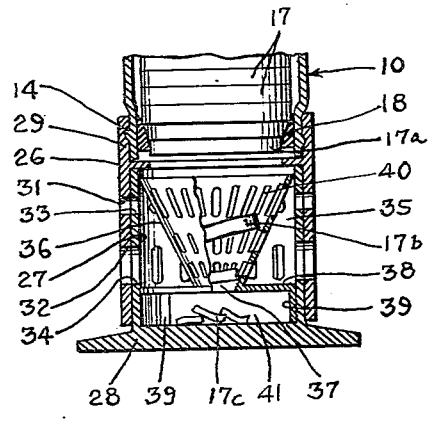
Fig. 4 is a partial sectional view similar to Fig. 3 and illustrating a supplemental gel supporting means within the base part.

When the lid or closure 15 is removed and the container 10 is inverted as shown in Figs. 2 to 4, the column of gel discs 18 will bear against the retaining and discharge control ring 18. The lowermost disc 17a will then be exposed to the atmosphere and evaporation of volatile components therefrom will commence. This evaporation causes a gradual shrinking or contraction of the ring 17a permitting it to slide downwardly in the ring 18 assuming a partially protruding position as seen for example in Fig. 2 of the drawing. When evaporation has sufficiently advanced the disc ring 17a will disengage itself automatically from the ring 18 and fall from the container 10 as a partially spent gel disc 17b which will thereafter continue to evaporate until it becomes a completely spent gel disc 17c which is very small in size as compared with the original gel disc 17.

In Fig. 2 of the drawing there is shown a simple spring clamp 21 mounted on a bracket 22 which can be secured as by the screws 23 to a suitable vertical support. In some uses and adaptations of the device the container 10 can merely be thus mounted above a shelf or other horizontal surface upon which the gel discs can be allowed to fall and continue evaporation. Suitably however, the bracket 21 can include a receptacle 24 having a dished portion 25 in alignment with the spring clamp 21 for receiving the discs or bodies of gel as they are individually discharged from the container 10. It will be noted in this connection that the relative size of the gel discs 17 and the discharge control ring 18 is preferably such that the partially spent gel disc 17b will be substantially spent before the next successive disc 17a drops from the container. In this way maximum freshness in the vapors emitted from the evaporating gel is insured.

With the assemblage as shown in Fig. 3 of the drawing the container 10 is mounted in the inverted position on a supporting base comprising an outer sleeve 26 rotatably mounted on an inner sleeve 27 which terminates in an enlarged bottom wall or pedestal 28. The upper edge of the sleeve 26 is provided with means as indicated by the offsets 29 for forming a lock engagement with the lugs or threads 14 on the container 10. The sleeve 26 may also include an inwardly extending peripheral flange 30 forming a stop preventing accidental displacement of the ring 18.

It will be evident however, that if the ring 18 is positively supported against displacement from the container 10 the inwardly extending flange 30 will not be necessary.

The other sleeve 26 is provided with an annular row of apertures 31 adjacent the upper end thereof and a second annular row of apertures 32 in the lower portion thereof. These apertures register with corresponding apertures 33 and 34 in the inner sleeve 27 and it will be evident that rotation of the sleeve 26 with respect to the sleeve 27 permits relative movement of the apertures from a fairly closed to a fairly open position. When the apertures are closed it will be evident that the evaporation of volatile components from the gel bodies will be substantially shortened and the innermost gel disc 17a will remain supported by the ring 18 until the apertures are again opened to permit further evaporation of the gel. The extent to which the apertures are opened will, of course, vary the rate at which vapors can escape from within the chamber or receptacle 35, thereby varying the rate at which gel discs are discharged from the container 10.

The device as shown in Fig. 4 of the drawing is identical with that shown in Fig. 3 with the exception that a supplemental gel receiving device 36 is arranged within the chamber 35. The gel receiving device 36 is of generally frusto-conical contour tapering toward a restricted opening 37 at the lower end thereof which is disposed centrally of a plate part 38 extending to inner surfaces of the inner sleeve 27 and supported above the bottom wall 28 by a plurality of legs 39. The frusto-conical portion of the gel receiver 36 has a plurality of apertures 40 throughout the periphery thereof, permitting free circulation of air therethrough. A partially spent gel slug 17b is caught and retained by the receiver 36 and permitted to slide gradually down the frusto-conical surface as evaporation proceeds and it is discharged as a spent disc 17c into the bottom chamber 41 formed below the plate 38. It will be evident that little or no air circulates in the chamber 41 thus minimizing the possibility of the spent gel bodies 17c affecting the quality of vapors emitted from the device.

With the gel receiving insert as shown in Fig. 4 of the drawing it will be evident that the partially spent gel disc 17b is more fully exposed to the circulation of air through the device as is maintained completely out of association with the spent gel bodies 17c. It will be evident that other means can be provided for similarly retaining the partially spent gel body in the air stream and discharging the fully spent gel bodies to a zone or compartment substantially out of the air stream.

The supporting base as shown in Figs. 3 and 4 and the gel receiver 36 as shown in Fig. 4 can be fashioned from various materials and can suitably be made of molded plastic material. It will also be evident that the supporting base and insert unit can be made in various sizes and shapes to accommodate dispensing containers 10 of different size and capacity.

Figure 5:
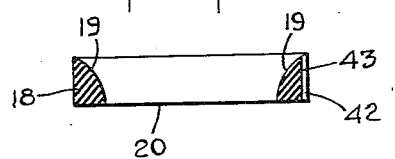
Fig. 5 is an enlarged sectional view of the discharge control ring for the dispensing container as shown in Figs. 1 to 4.

In Fig. 5 of the drawing there is shown an enlarged sectional view of the retaining ring 18 as shown in Figs. 1 to 4. In Fig. 5, however, there is indicated a groove 42 in the outer surface 43 which engages the container mouth. The groove 42 provides a vent permitting equalization of pressure within the container 10 with atmospheric pressure as the functioning device is subjected to different temperature conditions. While such a vent may not be necessary with smaller units it will be evident that with larger units a substantial increase in temperature could create pressure within the container 10 sufficient to prematurely eject gel discs 17 therefrom. In some instances it may even be desirable to employ a plurality of vent curves 42 of the type shown in Fig. 5.

It is within the scope of my invention to incorporate the gel retaining and discharge ring 18 as an integral part of a supporting base of the type shown in Figs. 3 and 4 in which event the gel discs could be packaged and shipped in a plain container and the container then merely mounted on the base for operative alignment of the gel discs with the retaining ring 18 of the base.

The particular type of supporting base shown in Figs. 3 and 4 is merely illustrative and it will be apparent that the base or evaporation chamber, as well as the means for regulating the flow or circulation of air can be altered or modified in many ways without departing from the basic principles and mode of operation which I have described. Such alterations or modifications can include means adapting the devices for attachment to or use in conjunction with air conditioning or air circulating systems and the like.

These and other changes and modifications in the automatic feed diffuser devices herein disclosed will occur to those skilled in the art and to the extent that such changes and modifications are embraced by the appended claims, it is to be understood that they constitute part of my invention.

I claim:

1. An automatic feed diffuser device for air treating gel comprising a container part having a bottom wall, side walls and an open mouth of a cross-section substantially as great as the cross-section through said side walls, a plurality of relatively thin discs of air treating gel arranged in superimposed relation within and substantially filling said container, a control element within the mouth of said container for preventing discharge of gel discs, when the container is in the inverted position, until substantial shrinkage of the outermost gel disc has occurred, and suspending means engaging said container for supporting the same in an elevated and inverted position, said suspending means comprising a supporting base engaging the mouth of the inverted container, said base having an enlarged chamber for receiving gel discs discharged from the container, and means for circulating air through said chamber.

2. An automatic feed diffuser device as defined in claim 1 wherein the supporting base includes inner and outer rotatable sleeves having apertures therein adapted to be opened and closed in different positions of rotary adjustment of said sleeves.

3. An automatic feed diffuser device as defined in claim 1 wherein the supporting base includes inner and outer rotatable sleeves having apertures therein adapted to be opened and closed in different positions of rotary adjustment of said sleeves, said apertures being arranged in rows spaced vertically of said base with the uppermost row of apertures being closely adjacent the container engaging means.

4. An automatic feed diffuser device for air treating gel comprising a container part having a bottom wall, side walls and an open mouth of a cross-section substantially as great as the cross-section through said side walls, a plurality of relatively thin dics of air treating gel arranged in superimposed relation within and substantially filling said container, a control element within the mouth of said container for preventing discharge of gel discs, when the container is in the inverted position, until substantial shrinkage of the outermost gel disc has occurred, suspending means engaging said container for supporting the same in an elevated and inverted position, said suspending means comprising a supporting base engaging the mouth of the inverted container, said base having an enlarged chamber for receiving gel discs discharged from the container, means for circulating air through said chamber, and means within the chamber of said base for receiving gel discs discharged from said container and supporting the same in the path of circulation of air through said chamber until evaporation of volatile components from the gel is substantially complete.

5. An automatic feed diffuser device for air treating gel comprising a container part having a bottom wall, side walls and an open mouth of a cross-section substantially as great as the cross-section through said side walls, a plurality of relatively thin discs of air treating gel arranged in superimposed relation within and substantially filling said container, a control element within the mouth of said container for preventing discharge of gel discs, when the container is in the inverted position, until substantial shrinkage of the outermost gel disc has occurred, suspending means engaging said container for supporting the same in an elevated and inverted position, said suspending means comprising a supporting base engaging the mouth of the inverted container, said base having an enlarged chamber for receiving gel discs discharged from the container, means for circulating air through said chamber, and means within the chamber of said base for receiving gel discs discharged from said container and supporting the same in the path of circulation of air through said chamber until evaporation of volatile components from the gel is substantially complete, said last named means comprising an essentially conical element having perforated walls for circulation of air therethrough and having the wider portion thereof disposed adjacent said container engaging means.

6. An automatic feed diffuser device for air treating gel comprising a container part having a bottom wall, side walls and an open mouth of a cross-section substantially as great as the cross-section through said side walls, a plurality of relatively thin discs of air treating gel arranged in superimposed relation within and substantially filling said container, a control element within the mouth of said container for preventing discharge of gel discs, when the container is in the inverted position, until substantial shrinkage of the outermost gel disc has occurred, suspending means engaging said container for supporting the same in an elevated and inverted position, said suspending means comprising a supporting base engaging the mouth of the inverted container, said base having an enlarged chamber for receiving gel discs discharged from the container, means for circulating air through said chamber, means within the chamber of said base for receiving gel discs discharged from said container and supporting the same in the path of circulation of air through said chamber until evaporation of volatile components from the gel is substantially complete, said last named means comprising an essentially conical element having perforated walls for circulation of air therethrough and having the wider portion thereof disposed adjacent said container engaging means, the lower restricted end of said conical element having an annular flange extending laterally to engage inner walls of said chamber, and means supporting said flange in elevated position with respect to the bottom of said chamber to thereby form below said conical element a compartment for receiving spent gel discs.

7. In combination with a storage container for circular disc-shaped bodies of volatilizable material having the characteristic property of undergoing overall shrinkage when evaporation occurs from an exposed surface thereof, a control element mounted in an open end of said container for regulating the discharge of said disc-shaped bodies individually from the inverted container, said control element comprising a ring-like member having a circular opening which is flared to provide a diameter within said container which is slightly larger than the diameter of said disc-shaped bodies and a diameter remote from said container which is slightly less than the diameter of said disc-shaped bodies, whereby discs are supported within the inverted container and individually discharged as shrinkage of the exposed disc-shaped body has sufficiently reduced its diameter to permit passage through said control element, and said control element having vent means in spaced relation to the flared opening thereof to equalize pressure inside and outside said container when disc-shaped bodies are resting on said control element.

References Cited in the file of this patent
UNITED STATES PATENTS

| | | |
|---|---|---|
| 997,676 | Irwin | July 11, 1911 |
| 1,225,728 | Cooley | May 8, 1917 |
| 1,294,883 | Dixon et al. | Feb. 18, 1919 |
| 1,496,491 | Ringler | June 3, 1924 |
| 1,665,659 | Evans | Apr. 10, 1928 |
| 2,251,058 | Kirkman | July 29, 1941 |
| 2,691,615 | Turner et al. | Oct. 12, 1954 |